Application August 31, 1955, Serial No. 531,702

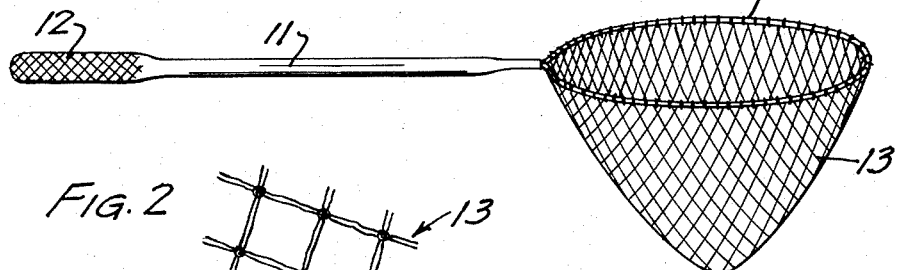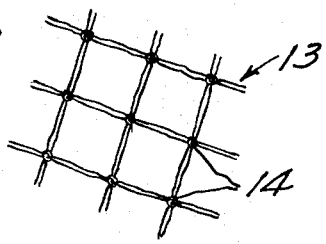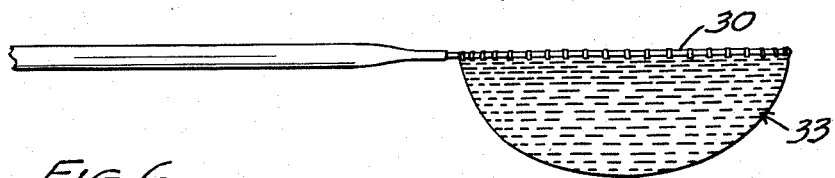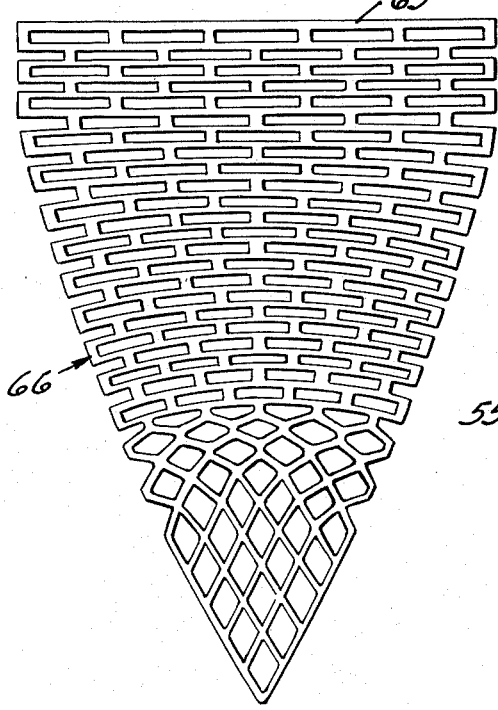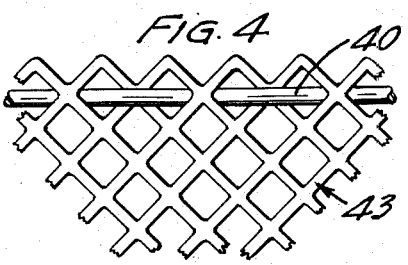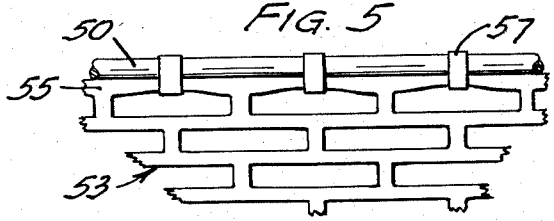
INVENTOR.
ROLF TJERNAGEL
BY
AGENT 2,847,790
LANDING-NET Rolf Tjernagel, St. Paul, Minn.

9 Claims. (Cl. 43—11)

This invention relates to landing-nets as used by fishermen in the landing of fish.

Landing-nets as previously provided have not been entirely successful for a number of reasons, as indicated by the variety of gaff hooks, tongs, and other devices which have been suggested as substitutes. The nets are necessarily made large enough to handle the largest fish which the angler is likely to hook, with the result that the net is unwieldy and awkward to handle in the boat and to use with smaller fish. The cords of the net retain weeds and dirt which must be removed by laborious picking or rinsing. More particularly, the cords are easily entangled with the hooks of a plug or other lure, making removal of a hooked fish from the net a difficult and even dangerous task. The construction of such a net, involving, as it does, the tying of innumerable knots, is laborious and expensive. Nevertheless the advantages of landing-nets over other forms of fish-landing devices, e. g. in avoiding injury to the fish and in requiring less skill in use, have resulted in continued popularity for this type of landing device.

The present invention has for its particular object the provision of a landing-net which overcomes the disadvantages of prior art landing-net structures while retaining all of their advantageous features. There is provided a shallow net which can be produced as a unit with a minimum of hand labor, which is self-adjusting as to depth, is easy to clean and to maintain free of materials such as dirt, slime and scales, and from which fish and fish-hooks may be easily removed.

These and other advantages are provided, in accordance with my invention, by constructing the net with substantially reduced initial depth as compared to conventional prior art forms of landing-nets, and by employing elastomeric monofilaments in place of conventional prior art cotton twine or analogous twisted, braided, or other multi-fiber cord material.

In the drawing, Figure 1 is an illustration in perspective of a complete landing-net; Figure 2 shows a detail of the net structure of Figure 1; Figure 3 shows the net and hoop portion of a modified form of landing-net; Figures 4 and 5 are fragmentary illustrations indicating alternative methods of attaching the net to a handle means; and Figure 6 is a net-forming gore or segment as used in constructing the net of Figure 3.

A typical landing-net structure as shown in Figure 1 comprises a handle and hoop portion of any desired shape or material of construction, that illustrated being a circular metal hoop 10 attached to an extended handle member 11 ending in a grip portion 12 of enlarged diameter, and having an elastic monofilamentary mesh net 13 attached to the circular metal hoop.

The substantially hemispherical net 13 of Figure 1 is formed of stationers' gum rubber bands or binders having a loop length of approximately two inches. These binders are capable of stretching to a total length of more than twelve inches under a stress of not more than about one pound, and do not break even under a stress of more than two pounds. Being in the form of endless rings or bands, the binders were conveniently fastened together end-to-end with knots in the form of girth-hitches; they were further tied together with square knots between the strands and elsewhere as required to form the rounded net. The mesh size was one-half the length of the knotted binder, each mesh being somewhat less than one inch on a side. The open circular end of the net was fastened to the steel bar forming the hoop 10 of the handle portion by tieing the terminal binders around the bar, which was then clamped to the handle. The diameter of the hoop was 21 inches, and the net was about 12 inches in maximum depth when hanging freely.

While the rubber binders employed in the above example are monofilamentary, the mesh net 13, as illustrated in Figure 2, has a pair of independent untwisted filaments between each two adjacent knots or connection points 14.

The landing-net as just described has been employed in landing fish varying in size from less than one pound up to several pounds in weight. Small fish cause almost no stretching of the net; they are therefore easily reached for removal. Larger fish cause proportionate stretching, so that they are completely contained within the net and thus have no opportunity to escape. The elasticity of the rubber mesh helps to restrain the fish during its struggles, and prevents shock breakage of the filaments such as frequently occurs with inelastic twine. A further important and quite unexpected advantage is that barded hooks, even including the gang hooks widely used on many plug type baits, do not become entangled in the elastic monofilamentary mesh but on the contrary are easily loosened and lifted from the net regardless of the struggling of the fish.

Another specific example, not shown, employs continuous monofilament rubber strands which are knotted together to form the desired mesh net in the same manner employed with conventional cotton twine. In this case only a single monofilament connects adjacent knots. The size and composition of the filament is selected to provide the desired degree of stretchiness and strength, which for a net of the size and shape previously described should be substantially equivalent to that of the two-strand rubber binder there identified.

The cross-section of the elastic monofilament may be circular or elliptical, as for an extruded product, or angular as in the case of a filament pattern stamped from a flat sheet. Smooth filament surfaces are desirable. Typical mesh structures produced by stamping are shown in Figures 4–6. The ends of the filaments may be passed over the hoop member and fastened by knotting, as in the net of Figure 1. Alternatively, the edge of the net is finished off in a series of loops, as in Figure 4, or in a continuous ring or rim structure as in Figure 5, the edge being of the proper size, when in unstretched condition, to coincide with the metal support hoop. The rings of the net 43 of Figure 4 fit over the loop 40, whereas the rim 55 of the net 53 of Figure 5 is fastened at intervals to the ring 50 by means of metal clamps 57.

The net 33 of Figure 3 is formed from a plurality of flat sheets of stretchable rubber composition. These are cut to size and portions punched out in a pattern to provide a mesh-like structure having monofilamentary strips between connection points. Suitably shaped segments or gores are then combined, e. g. by means of small metal clips along adjoining edge portions, to produce the desired net shape, which is then attached to the hoop by any convenient method.

One such punched section 66 is illustrated in Figure 6. In this modification the mesh pattern near the rim 65 differs from that near the tip of the section, the openings being in the form of long narrow slots. The net itself, as shown in Figure 3, is very shallow when in unstressed condition, since the thin elastomeric sheeting employed is of sufficient thickness and strength to prevent any substantial distortion of the mesh. A typical net made in this way has a hoop diameter of 21 inches and a depth of only 8 inches. However the net expands greatly in depth under slight stres, as the slot-like openings are distorted into diamond shapes by stretching the elastic sheet material adjacent the corners of the openings. Further expansion of the net under increased stress then involves stretching of the monofilamentary elastomeric connecting strands as well.

The net may also be formed, either in a single piece or in a plurality of segments, by pressure molding methods such as compression or injection molding. While the high cost of the necessary molds and dies is a deterrent for such methods, the nets formed are equally satisfactory and the molding process is rapid and economical. The thin section of the monofilaments formed permits rapid curing of the rubbery composition to be accomplished. Where the net is molded in a single piece, no assembly operations are involved other than attaching to the handle member. The process also makes it possible to increase the thickness and strength of the filaments along the areas of greatest stress, for example at the rim portion which is to be attached to the hoop member. Inserts such as wire reinforcing members or metal clip members, may be incorporated in the rim during molding; or the hoop member itself may be permanently molded within such rim portion.

Still other variations and modifications will suggest themselves to those skilled in the art of elastic filaments and the like in view of the disclosures here provided. The specific examples given are therefore to be construed as illustrative rather than limitative. For example, the net may be formed by a dip process involving dipping a mold into a fluid rubber composition, scraping away excess material, curing the resulting mesh-shaped product either by heating or by dip or vapor cure, and stripping it from the mold.

The specific compositions employed in forming the monofilaments may be widely varied, and compositions suitable for substantially any desired variation in properties are available. Pure gum rubber formulas, e. g. as employed in rubber binders, are excellent in stretchiness and elasticity but tend to deteriorate when exposed to sunlight for prolonged periods. Antioxidants and preservatives of various kinds are helpful under such circumstances. Pigmenting affords protection from sunlight and permits the net to be made in distinctive or protective colors. When carefully controlled, pigments and fillers do not deleteriously reduce the stretchiness and frequently greatly increase the strength of the resulting filaments. Synthetic elastomers are often superior to natural rubber in resistance to sunlight and oxidation, and formulas employing such materials are also applicable to the present invention.

While the invention has been described particularly with respect to landing-nets of a size and shape especially applicable to the landing of fish ranging from one to fifteen or twenty pounds, it will be apparent that the principles involved may equally well be applied to both smaller and larger dip-nets as well as to minnow-nets or seines and other analogous structures and devices.

What I claim is as follows:

1. A landing-net suitable for retaining fish and comprising an elastic mesh net member of interconnected rubbery elastomeric monofilaments, and handle means for supporting and manipulating said mesh.

2. A landing-net suitable for retaining fish and comprising a unitary elastic mesh net member of interconnected rubbery elastomeric monofilaments, and handle means for supporting and manipulating said mesh.

3. A landing-net suitable for retaining fish and comprising a net member of edge-interconnected segments of an elastic mesh of interconnected rubbery elastomeric monofilaments, and handle means for supporting and manipulating the composite net.

4. A landing-net comprising a hemispherically shaped elastic mesh net member of interconnected rubbery elastomeric monofilaments, a hoop member for supporting said net member in open position, and a handle member for manipulating said hoop and net.

5. A hemispherically shaped elastic net member of restricted depth when supporting only its own weight, capable of being greatly extended in depth under slight stress and suitable for use in a landing-net, said hemispherical member being formed of thin rubbery elastomeric sheeting provided with mutually overlapping slot-like openings throughout at least the areas adjacent the edge of the hemisphere and with the longitudinal direction of said slot-like openings paralleling said edge.

6. An elastic rubbery mesh sheet material in the form of a generally three sided section or gore suitable for combining along two sides with other such sections, and with the third sides of the inter-connected sections forming a continuous rim, in the assembling of a landing-net as herein described, said sheet material being provided with mutually overlapping slot-like openings throughout at least the areas adjacent the rim forming edge of said section and longitudinally aligned with said edge.

7. A pouch-like receptacle suitable for retaining fish, comprising an elastic mesh net member of interconnected rubbery elastomeric monofilaments.

8. A pouch-like receptacle suitable for retaining fish and capable of extending in depth under the weight of said fish, comprising an elastic mesh of interconnected rubbery elastomeric monofilaments forming mutually overlapping mesh openings, the pouch-like receptacle having a rim portion around the open mouth thereof, the mesh openings adjacent said rim portion being extended in a direction parallel to said rim.

9. A pouch-like receptacle suitable for retaining fish and extensible under the weight of said fish, having a rim portion around the open mouth of the pouch and, depending therefrom, an elastic mesh of interconnected rubbery elastomeric monofilaments forming mutually overlapping mesh openings and providing the body of said receptacle, at least said rim portion being formed of interconnected sections of said mesh having elongate mesh openings extending in a direction parallel to the rim.

References Cited in the file of this patent

UNITED STATES PATENTS

| | | |
|---|---|---|
| 1,543,568 | Howard | June 23, 1925 |
| 1,882,291 | Monroe et al. | Oct. 11, 1932 |
| 1,910,073 | Weidhaas | May 23, 1933 |
| 1,925,516 | Bockman | Sept. 5, 1933 |
| 2,355,635 | Dublier | Aug. 15, 1944 |
| 2,420,087 | Meek | May 6, 1947 |
| 2,485,781 | Schreiber et al. | Oct. 25, 1949 |